United States Patent
Nemoto et al.

(10) Patent No.: US 7,441,082 B2
(45) Date of Patent: Oct. 21, 2008

(54) STORAGE-DEVICE RESOURCE ALLOCATION METHOD AND STORAGE DEVICE

(75) Inventors: Naokazu Nemoto, Yokohama (JP); Norifumi Nishikawa, Machida (JP); Kazuhiko Mogi, Yokohama (JP); Masaru Kitsuregawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 11/028,218

(22) Filed: Jan. 4, 2005

(65) Prior Publication Data
US 2006/0085598 A1    Apr. 20, 2006

(30) Foreign Application Priority Data
Oct. 20, 2004    (JP)    ............... 2004-305084

(51) Int. Cl.
G06F 12/00    (2006.01)
G06F 13/00    (2006.01)
G06F 13/28    (2006.01)
(52) U.S. Cl. .................. 711/113; 711/112; 711/154
(58) Field of Classification Search .............. 711/133
See application file for complete search history.

(56) References Cited
U.S. PATENT DOCUMENTS
5,353,410 A * 10/1994 Macon et al. ............... 711/144
6,571,326 B2 * 5/2003 Spiegel et al. .............. 711/170
2005/0177546 A1 * 8/2005 Nakano et al. .............. 707/1

FOREIGN PATENT DOCUMENTS
| JP | 2003-150414 | 5/2003 |
|----|-------------|--------|
| JP | 2003-150418 | 5/2003 |
| JP | 2003-150419 | 5/2003 |
| JP | 2003-337722 | 11/2003 |
| JP | 2004-110218 | 4/2004 |
| JP | 2004-192292 | 7/2004 |

OTHER PUBLICATIONS

Ron White, How Computers Work, 1994, Ziff-Davis Press, First Edition, pp. 67 and 71.*
D.A. Patterson et al., Computer Architecture a Quantitative Approach, Morgan Kaufmann Publishers, pp. 403-487, 1990.

* cited by examiner

Primary Examiner—Reginald G. Bragdon
Assistant Examiner—Eric S Cardwell
(74) Attorney, Agent, or Firm—Antonelli, Terry, Stout & Kraus, LLP.

(57) ABSTRACT

Data writing into a storage device. Data is written into a cache memory in order to implement speeding-up, and also the data is written into a physical disc asynchronously therewith. Since allocation of the cache memory is performed on each writing-request basis, a cut-out processing is required which is executed when none of available areas exists. This results in a problem of necessitating a writing processing time. A DBMS server in advance notifies the storage device that a writing will take place. A manager included in the storage device performs acquisition of the cache memory prior to the writing processing. This allows the data to be stored into the acquired cache memory at the time of the writing processing.

6 Claims, 14 Drawing Sheets

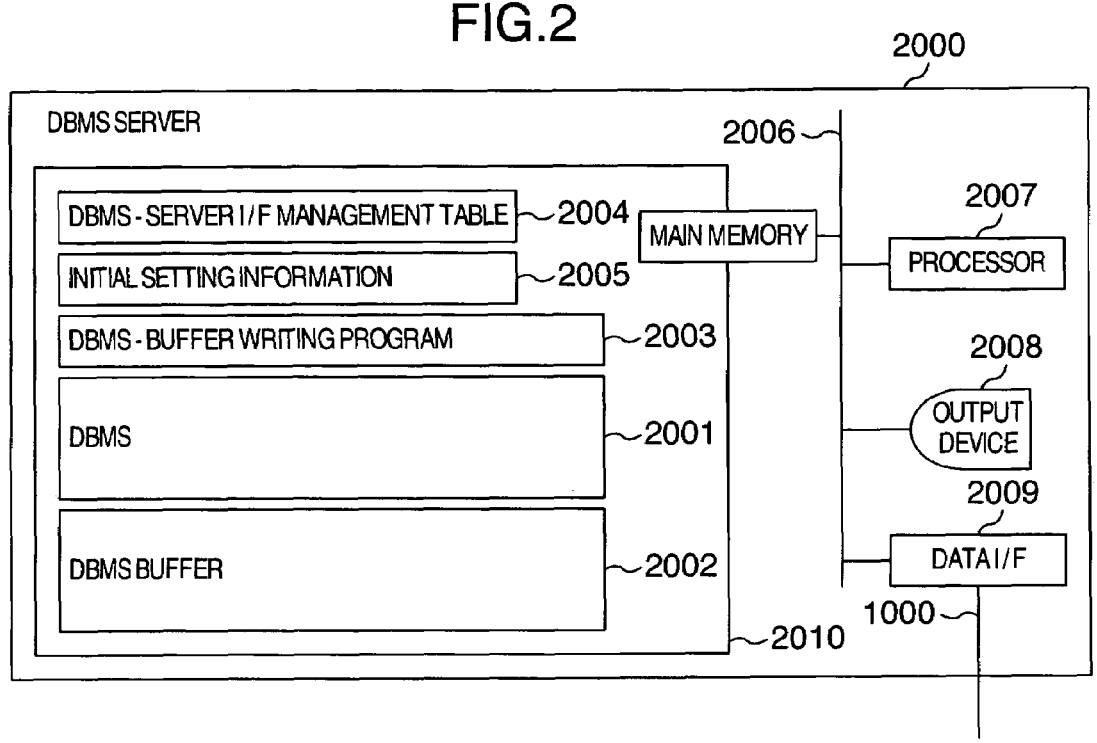
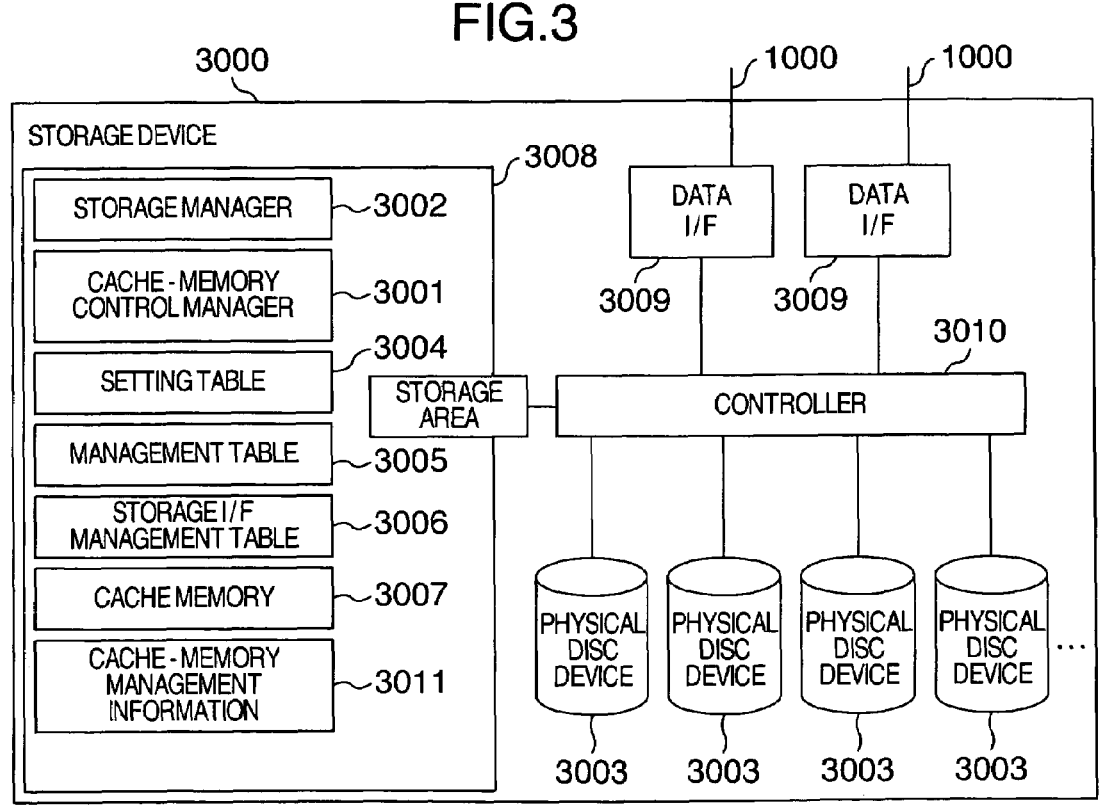

FIG.4A

| DB-I/F | NAME |
|---|---|
| D1 | DB1 |

| WRITING-OUT DATA TYPE | WRITING-OUT CONDITION | IN-ADVANCE NOTICE SETTING CONDITION | SCSI-ID | LUN | NAME |
|---|---|---|---|---|---|
| DB-CH1 | J1 | JT1 | 1 | 1 | ST1 |
| DB-CH2 | J2 | JT2 | 1 | 2 | ST1 |

| STORAGE I/F | NAME | SCSI-ID |
|---|---|---|
| S1 | ST1 | 1 |

| NAME | DBMS-ID | LUN | CACHE SIZE | CACHE FRONT ADDRESS | CACHE EFFECTIVE TIME | ACQUISITION STATE | WRITING-OUT DATA TYPE |
|---|---|---|---|---|---|---|---|
| DB1 | DBMS1 | 1 | 100 | ADD0001000 | 100 | UNDER ACQUISITION | DB-CH1 |
| DB1 | DBMS1 | 2 | 150 | ADD0100300 | 100 | ACQUISITION OVER | DB-CH2 |

3005

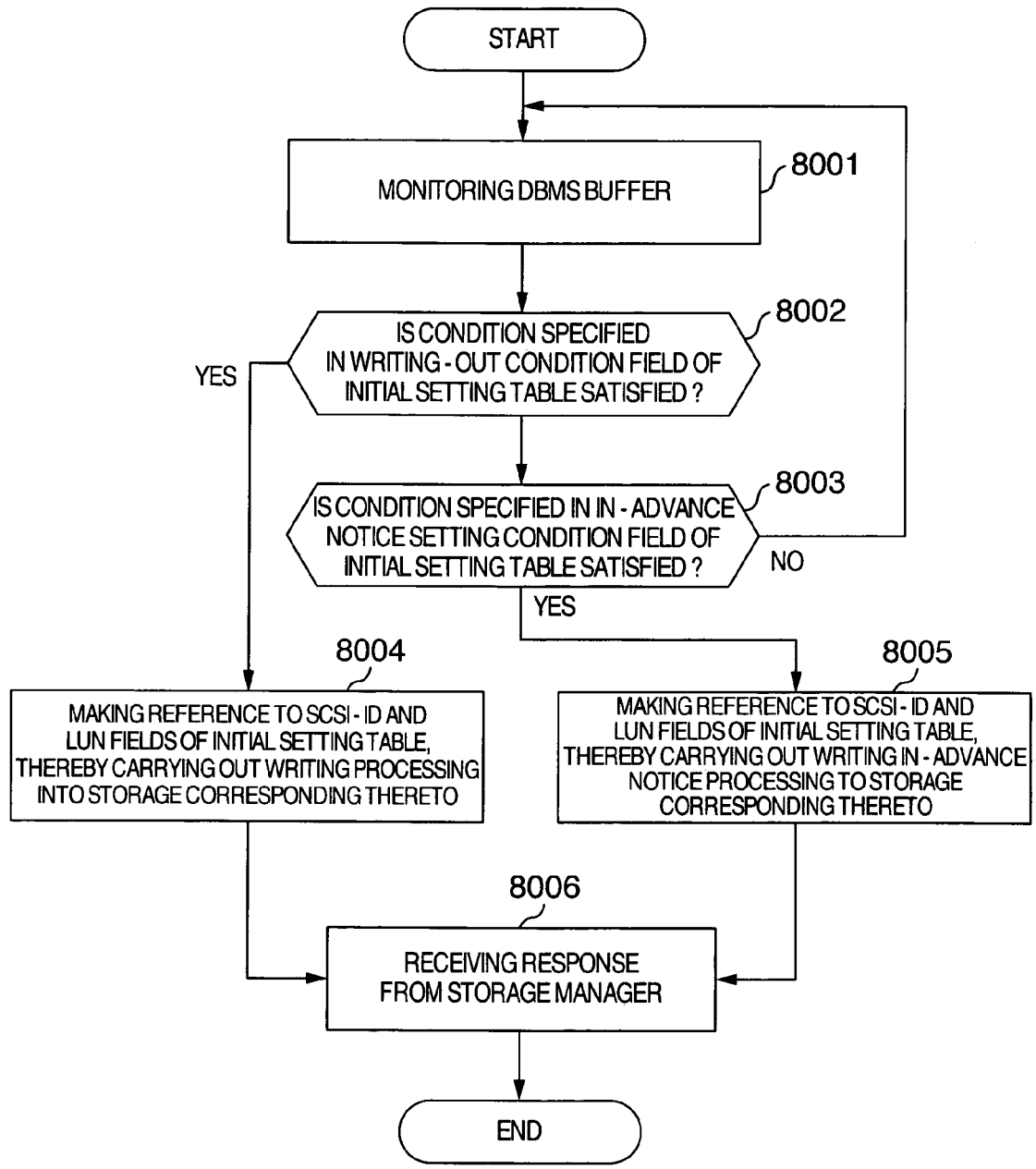

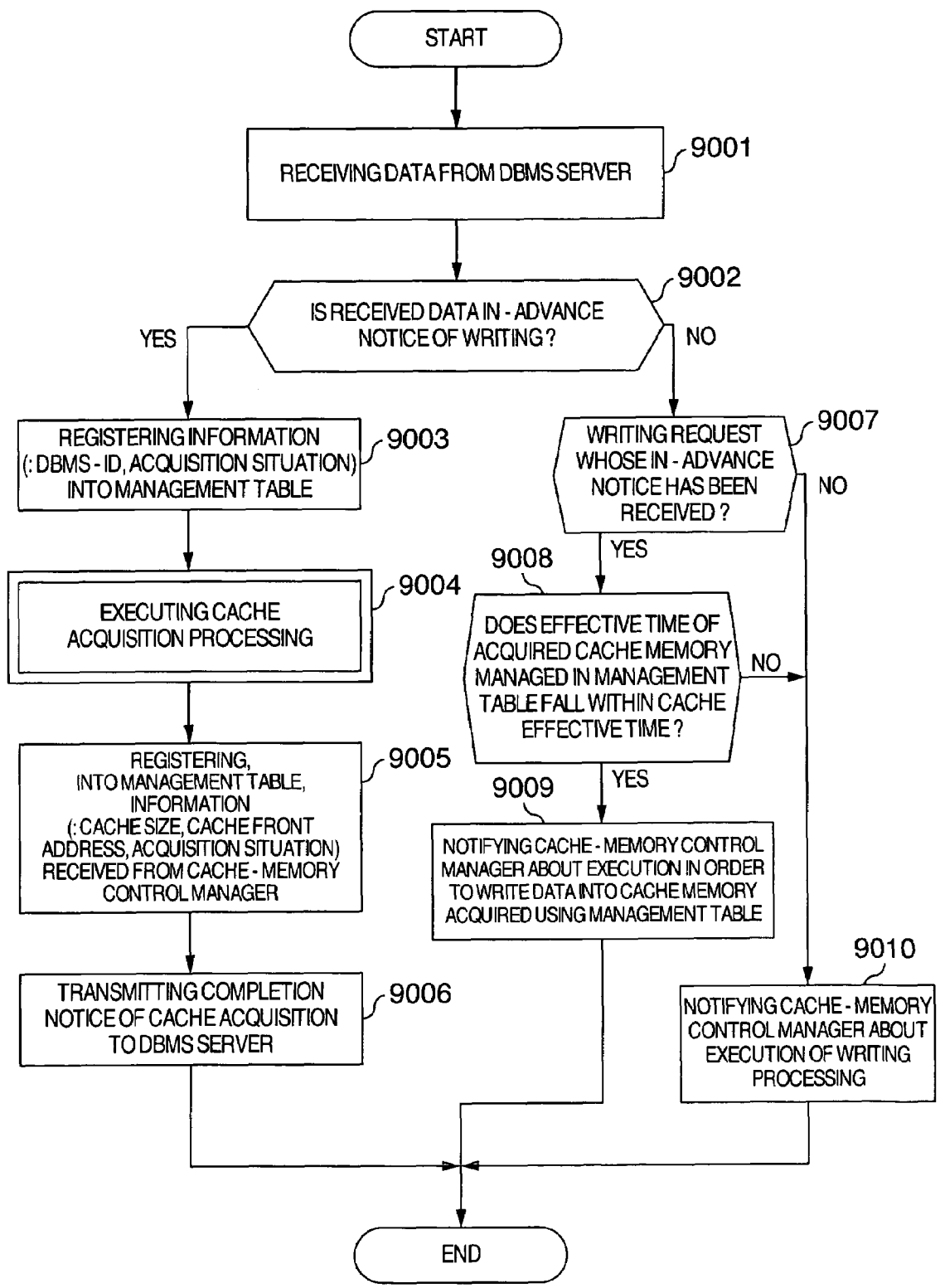

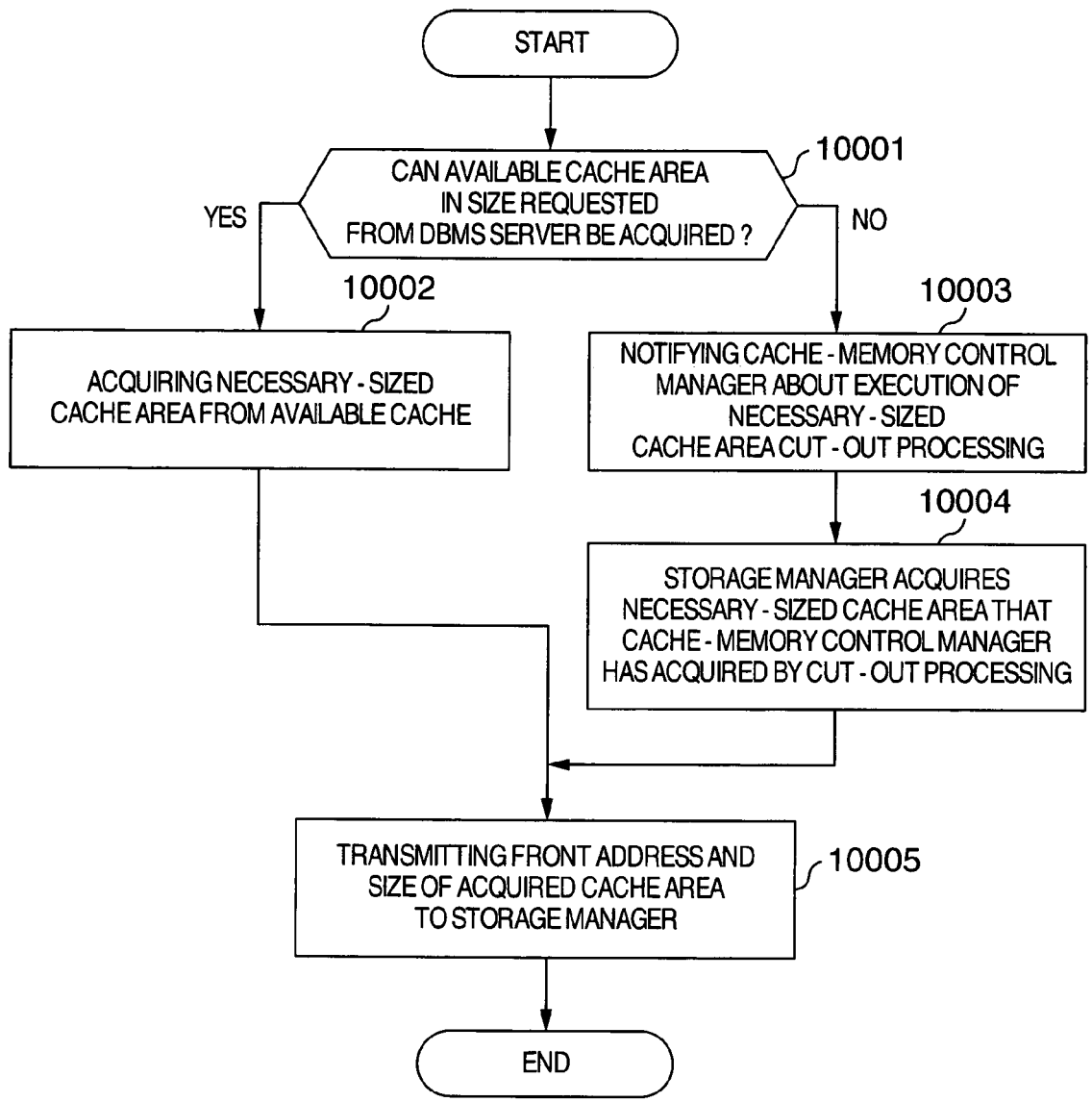

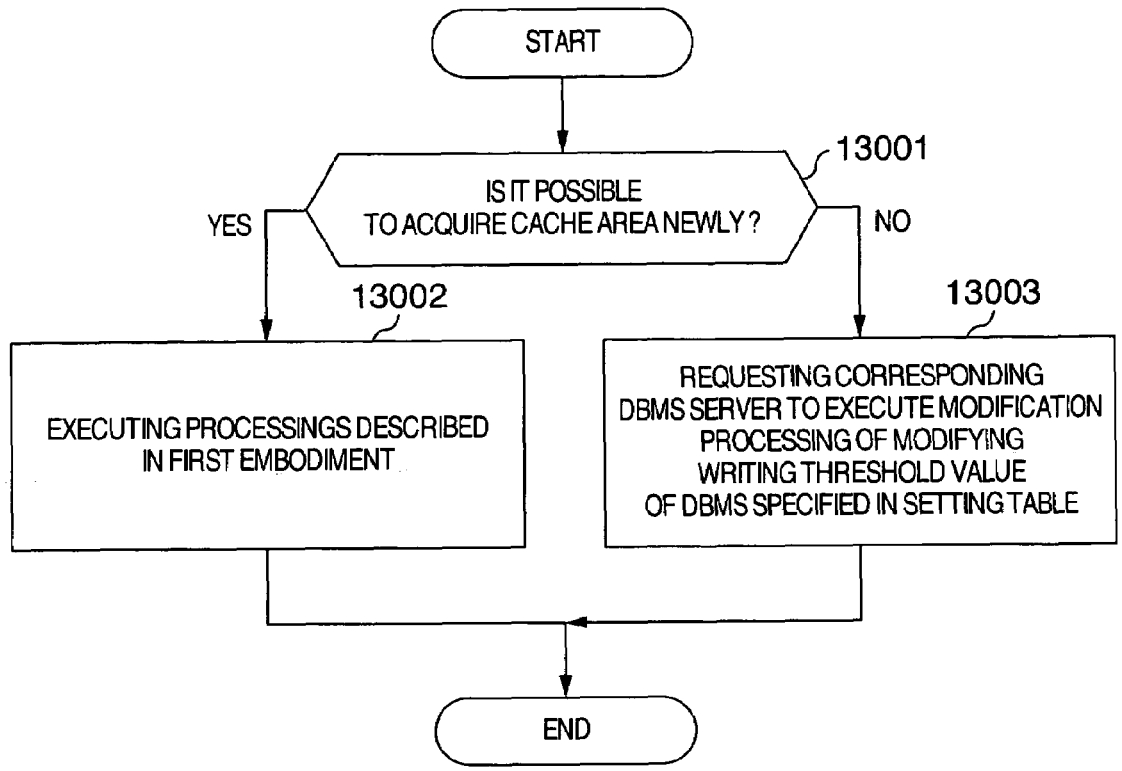
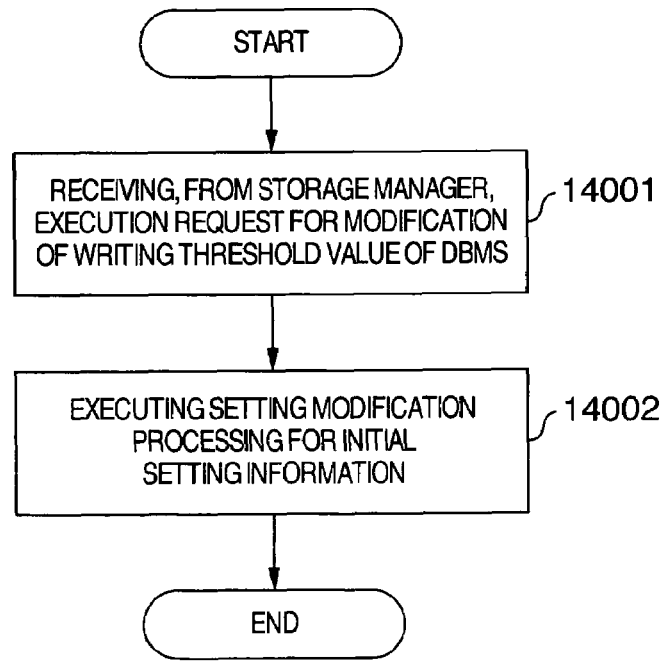

FIG.14

| LOG-DATA STORAGE FILE NAME | SCSI-ID | LUN |
|---|---|---|
| LOG1 | 1 | 1 |
| LOG2 | 1 | 2 |

| NAME | DBMS-ID | LUN | CACHE SIZE | CACHE FRONT ADDRESS | EFFECTIVE TIME | COLLECTIVELY WRITTEN DATA THRESHOLD-VALUE | ACQUISITION STATE | LOG-DATA STORAGE FILE NAME | WRITING FLAG |
|---|---|---|---|---|---|---|---|---|---|
| DB1 | DBMS1 | 1 | 100 | ADD0001000 | 100 | 384K | UNDER ACQUISITION | LOG1 | 0 |
| DB1 | DBMS1 | 2 | 150 | ADD0100300 | 100 | 384K | ACQUISITION OVER | LOG2 | 1 |

3100

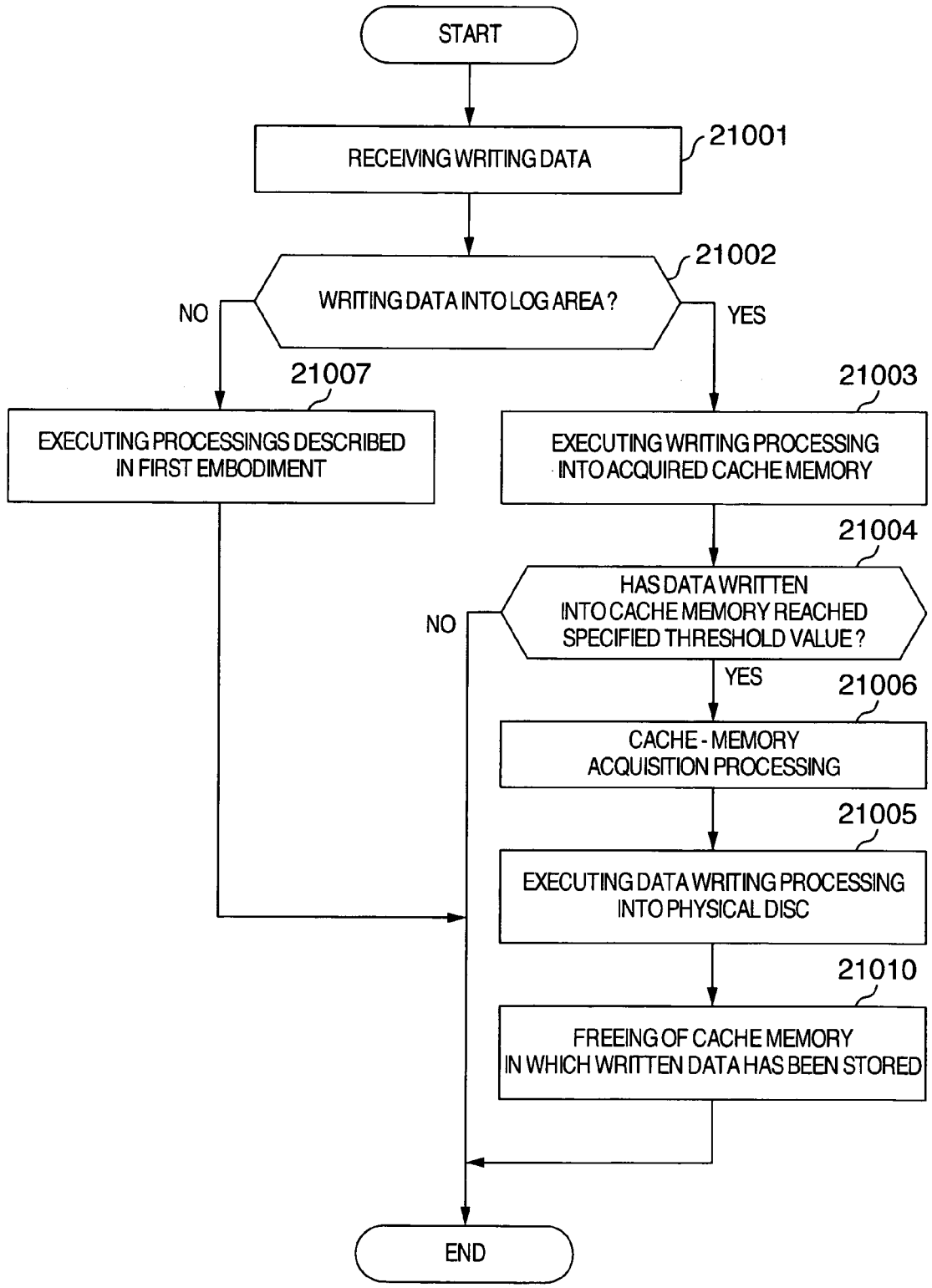

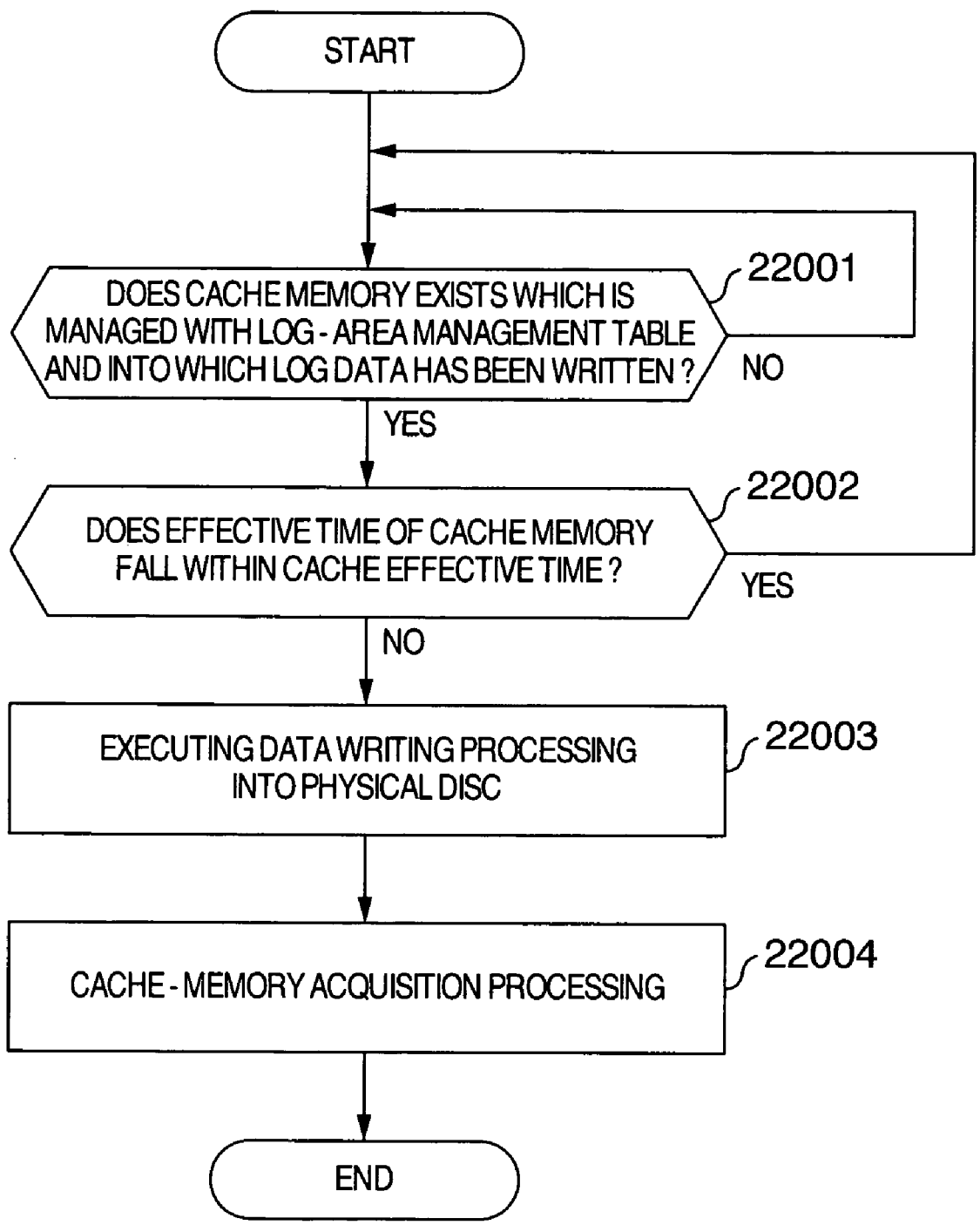

STORAGE-DEVICE RESOURCE ALLOCATION METHOD AND STORAGE DEVICE

INCORPORATION BY REFERENCE

The present application claims priority from Japanese application JP2004-305084 filed on Oct. 20, 2004, the content of which is hereby incorporated by reference into this application.

BACKGROUND OF THE INVENTION

1. Field of the Invention

The present invention relates to a storage system used for a computer system. More particularly, it relates to a storage system (hereinafter, also referred to as "database system") used for a database.

2. Description of the Related Art

In a storage device, speeding-up of processing for a writing or reading request, which is issued from a computer (hereinafter, also referred to as "server") connected to the storage device, is implemented in the following manner: Concretely, in addition to a non-volatile storage medium (e.g., a hard disc drive, which, hereinafter, will be also referred to as "disc device") for storing data, the storage device also includes a volatile storage medium (e.g., a semiconductor memory, which, hereinafter, will be also referred to as "cache memory") for storing data temporarily.

When the storage device accepts a data reading (or writing) request from the server, if the data requested has been stored in the cache memory, the storage device terminates the processing (which, concretely, means making a response to the server) by the data reading (or writing) from the cache memory. In general, the cache memory includes no mechanical configuration component, and, by the amount equivalent thereto, the cache memory is faster as compared with the disc device in reading speed or the like. Consequently, omitting processing to the disc device allows the implementation of speeding-up of the response processing to the server.

Incidentally, the data stored in the cache memory will be lost if power supply to the cache memory is cut off. Accordingly, in the storage device, the data written into the cache memory is stored into the disc device asynchronously with the processing for the writing request from the server. In a non-patent document 1 (John L. Hennessy and David A. Patterson, Computer Architecture: A Quantitative Approach, Morgan Kaufmann Publishers, Inc.), there have been described configuration of the computer system and operation steps for data to be written from the cache memory into the disc device.

SUMMARY OF THE INVENTION

In the prior art, when the storage device receives a data writing request, the storage device is required to acquire a storage area of the cache memory which is equivalent to data amount to be written therein. In some cases, however, size of a storage area (hereinafter, also referred to as "available area") which is unused of the entire storage area of the cache memory that the storage device has becomes lower than the data size to be written therein. In this case, the storage device is required to perform a processing (hereinafter, also referred to as "cut-out processing") for modifying, into an available area, a part or the whole of a storage area (hereinafter, also referred to as "used area") which has been already used in the cache memory.

The cut-out processing is the following processing: Namely, when storing data to be written into the cache memory, in order to acquire an available area which is insufficient, the storage device liberates (i.e., deletes) data stored in a used area of the cache memory. This processing modifies, into the available area, the used area that the cached data has used. If an available area of the cache memory is small, if capacity itself of the cache memory is small in amount, or if data amount of the writing target transmitted from the server is large, the storage device is required to acquire the available area of the cache memory each time a data writing request is issued from the server. This situation obstructs speeding-up of the processing in the storage device. Also, if data writing requests are issued from plural servers to the storage device, a scramble for the available area of the cache memory among the respective servers occurs in the storage device. This situation lowers the writing speed.

One aspect of the present application is configured as follows: Namely, a server in advance notifies the storage device about a data writing request into the storage device. Then, in accordance with this notice, the storage device acquires (hereinafter, also referred to as "reserves") an available area of the cache memory.

Incidentally, depending on type of data to be written into the storage device, the server may determine the necessity or unnecessity for issue of the in-advance notice.

Moreover, the following configuration is also considerable: With respect to the available area of the cache memory whose reservation the storage device has made once, the storage device cancels this reservation in accordance with a predetermined condition.

Also, the following configuration is also allowable: With respect to specific data (e.g., log data), a state where the cache memory is always reserved is prepared.

The above-described configurations make it possible to shorten a response time to the server of a data writing processing in the storage device.

BRIEF DESCRIPTION OF THE DRAWINGS

FIG. 2 is a diagram for illustrating a configuration example of server;

FIG. 3 is a diagram for illustrating a configuration example of storage device;

FIGS. 4A-4D are diagrams for illustrating configuration examples of respective types of tables;

FIG. 5 is a flowchart for illustrating an example of a processing of performing in-advance notice and a processing of writing content of DBMS buffer into the storage device;

FIG. 6 is a flowchart for illustrating an example of a writing execution processing into the storage device and a processing of performing in-advance acquisition of cache memory;

FIG. 7 is a flowchart for illustrating an example of the cache-memory acquisition processing;

FIG. 10 is a flowchart for illustrating an example of a processing where, if the storage device has failed to acquire the cache memory in advance, a modification processing of modifying a writing threshold value and a threshold value whose in-advance notice is to be performed is requested to DBMS server;

FIG. 11 is a flowchart for illustrating an example of a modification processing of DBMS server's modifying a writing-out threshold value;

FIG. 14 is a diagram for illustrating an example of log-area specification table;

FIG. 15 is a diagram for illustrating an example of log-area management table;

FIG. 17 is a flowchart for illustrating a procedure-step example of a writing processing of log data in the storage device;

FIG. 18 is a flowchart for illustrating an example of a writing processing of the log data of the storage device into physical disc device;

DETAILED DESCRIPTION OF THE EMBODIMENTS

Figure 1:
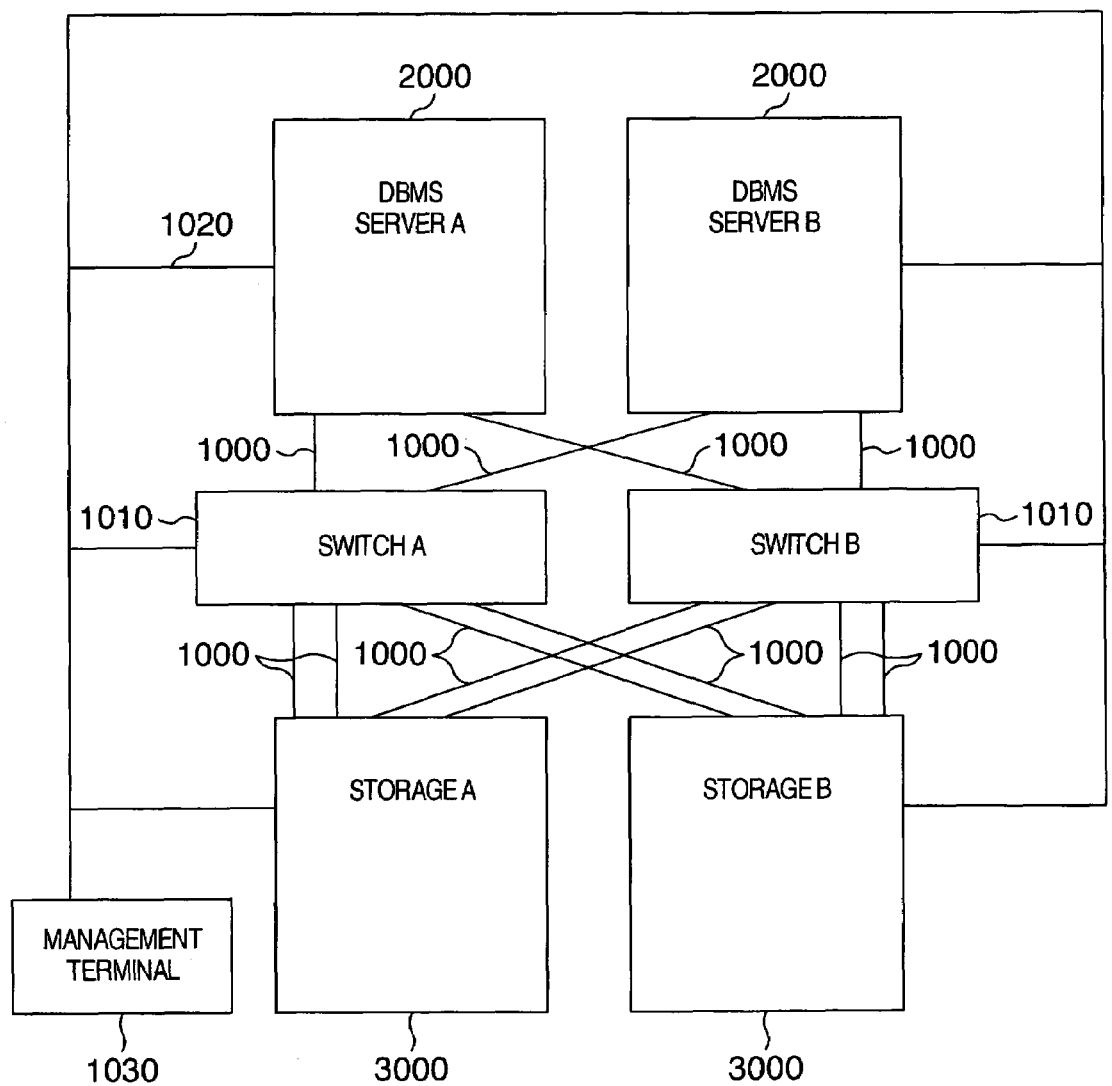
FIG. 1 is a diagram for illustrating a configuration example of computer system.

Hereinafter, referring to the drawings, the explanation will be given below concerning embodiments of the present invention. Incidentally, the present invention is not limited to these embodiments.

First Embodiment

In the present embodiment, a server in advance notifies a storage device about a data writing request into the storage device. Then, in accordance with this notice, the storage device acquires (hereinafter, also referred to as "reserves") an available area of a cache memory.

FIG. 1 is a diagram for illustrating a configuration example of computer system in the present embodiment. The computer system in the present embodiment includes plural servers 2000, plural storage devices 3000, and plural switches 1010 and a network 1000 for interconnecting the plural servers 2000 with the plural storage devices 3000. The switches 1010 may be switch devices for virtualizing storage areas among the servers and the storage devices. It is assumed, however, that, in the case of using the switch devices or the like for performing the virtualization, a message or the like transmitted from the servers 2000 undergoes the transformation in the switches 1010.

Incidentally, in all of the embodiments, the servers 2000, the storage devices 3000, and the switches 1010 are arbitrary in number. FIG. 1 illustrates the configuration example where the respective devices are two in number. Also, the servers 2000 and the storage devices 3000 may also be interconnected via a network appliance other than the switches 1010. As a concrete example of the network appliance, there exists LAN, router, or the like. As a concrete example of the network 1000, there exists physical cable such as fiber channel (hereinafter, also referred to as "FC").

Incidentally, in the present embodiment, the servers 2000 execute a program referred to as "database management system" (hereinafter, also referred to as "DBMS"). Hereinafter, the servers 2000 which execute the DBMS will be referred to as "DBMS servers". Here, the DBMS refers to such programs as update, retrieval, table creation, and definition of content of a database stored in the storage devices 3000, i.e., programs executed in the servers in order to control the database. The present invention, however, can also be carried out in a computer system including severs which do not execute the DBMS.

FIG. 2 is a diagram for illustrating a configuration example of the DBMS server 2000. The DBMS server 2000 includes a processor 2007, a main memory 2010, one or more interfaces (hereinafter, referred to as "I/Fs") 2009 for establishing connection with the other devices including the storage devices 3000, and an output device 2008 for outputting execution results of the respective types of programs executed by the processor 2007 of the DBMS server 2000. These respective devices are connected to each other via a communications path 2006 such as an inner bus. Additionally, the numbers of the respective configuration components are arbitrary.

The main memory 2010 stores therein a DBMS 2001, a DBMS-server I/F management table 2004, a DBMS buffer 2002, a DBMS-buffer writing program 2003, and initial setting information 2005. The processor 2007 reads and executes the programs stored into the main memory 2010. Additionally, the main memory 2010 also stores therein another application program executed by the server processor 2007.

The DBMS-server I/F management table 2004 is a table that the DBMS server 2000 uses when controlling the I/Fs 2009. The DBMS buffer 2002 is a storage area into which data that the DBMS 2001 deals with is temporarily stored. The DBMS-buffer writing program 2003 is a program executed by the processor 2007 when the DBMS server 2000 transmits the data stored in the DBMS buffer 2002 to the storage devices 3000 on the basis of a predetermined condition, or when the DBMS server 2000 in advance notifies (hereinafter, also referred to as "in-advance notice") the storage device 3000 of occurrence of the transmission processing and an acquisition request for an available area of the cache memory. The initial setting information 2005 registers therein setting information on the DBMS server 2000 or the like set by a manager of the computer system.

FIG. 3 is a diagram for illustrating a configuration example of the storage device 3000. The storage device 3000 includes a controller 3010 for performing control within the storage device 3000, a storage area 3008, I/Fs 3009 connected to the other devices including the DBMS servers 2000, and one or more physical disc devices 3003. These devices are connected to each other via the controller 3010.

The storage area 3008 is a volatile memory device. The storage area 3008 includes an area to be used as the cache memory 3007 and an area into which the other information is to be stored. The area into which the other information is to be stored stores therein a storage I/F management table 3006, a storage manager 3002, a cache-memory control manager 3001, a management table 3005, and a setting table 3004.

The storage I/F management table 3006 is a table that the controller 3010 uses when controlling the I/Fs 3009. The storage manager 3002 is a program that the controller 3010 executes when the storage device 3000 has received the in-advance notice from the DBMS server 2000. The cache-memory control manager 3001 is a program that the controller 3010 executes when controlling storage or the like of the data into the cache memory 3007. The cache-memory control manager 3001 is also executed when the controller 3010 executes a cut-out processing for the cache memory 3007.

The management table 3005 stores therein information (hereinafter, "management information") which becomes necessary for the controller 3010 to recognize the state of the cache memory 3007. The setting table 3004 has stored therein information (hereinafter, "setting information") which the controller 3010 uses for controlling the cache memory 3007 and the DBMS servers 2000.

Cache-memory management information 3011 has stored therein information for recognizing the use situation of the cache memory. The controller 3010 performs the recognition of a used area and an unused area within the cache memory by using the cache-memory management information 3011. Concretely, the controller 3010 manages storage area of the cache memory by using list structure or the like. When a data writing has been performed, the controller performs addition or the like of the data into the list.

Incidentally, the data I/Fs 3009 and the physical disc devices 3003 included in the storage device 3000 may be arbitrary in number as log as the numbers are larger than one.

Figure 20:
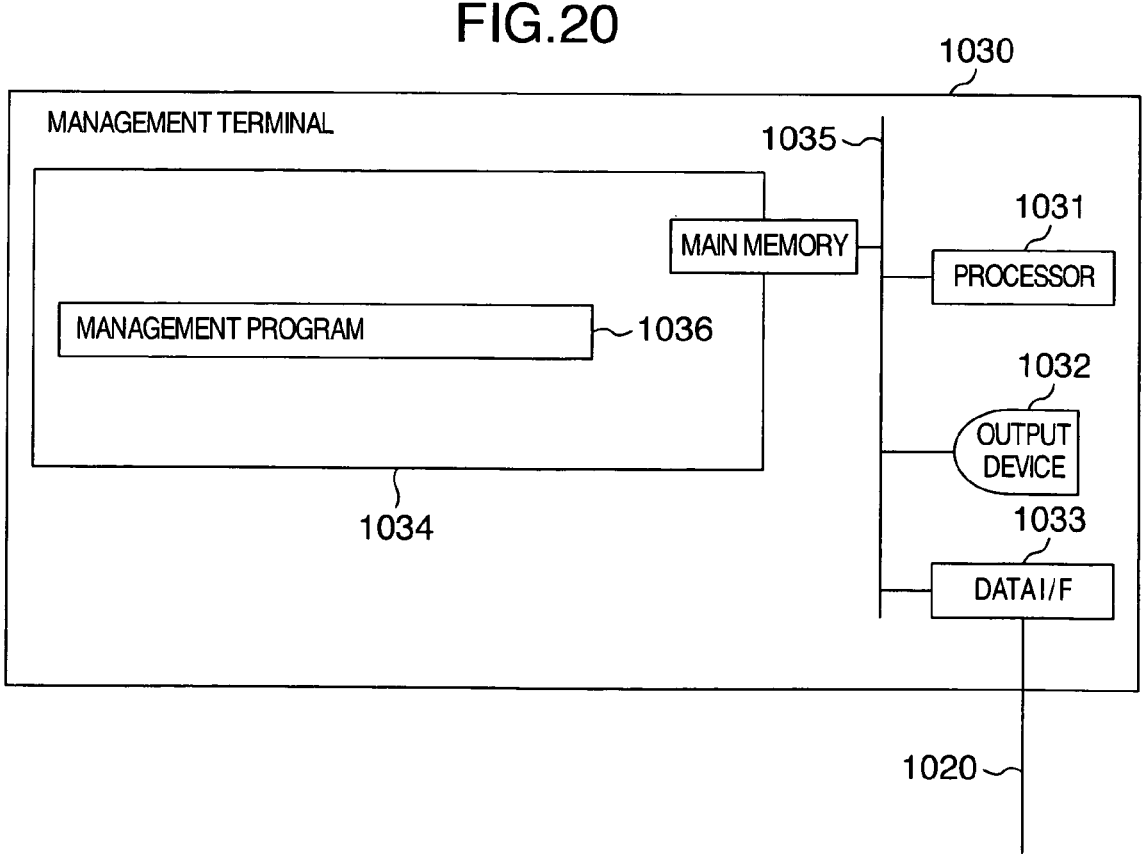
FIG. 20 is a diagram for illustrating a configuration example of management terminal.

FIG. 20 is a diagram for illustrating a configuration example of a management terminal 1030. The management terminal 1030 is a terminal for performing setting of the initial setting information 2005 of the DBMS servers 2000 and setting of the setting information stored in the setting table 3004 of the storage devices 3000. The management terminal 1030 includes a processor 1031, a main memory 1034, one or more I/Fs 1033 for establishing connection with the DBMS servers 2000 and the storage devices 3000, and an output device 1032 that the manager uses when performing operation. These respective devices are connected to each other via a communications path 1035 such as an inner bus. The main memory 1034 stores therein a management program 1036, i.e., a program that the management terminal 1030 executes when performing the setting of the initial setting information 2005 of the DBMS servers 2000 and the setting of the setting information in the setting table of the storage devices 3000.

Incidentally, as another embodiment, the management terminal 1030 may also be a computer which is identical to the DBMS servers 2000. In this case, the above-described management program 1036 is integrated into the DBMS servers 2000 and the storage devices 3000.

FIGS. 4A-4D are diagrams for illustrating configuration examples of the above-described respective types of tables. FIG. 4A is a diagram for illustrating a configuration example of the DBMS-server I/F management table 2004. The DBMS-server I/F management table 2004 has records whose number is equivalent to the number of the storage devices 3000 that the DBMS server 2000 uses. Each record includes a connection I/F identifier for a storage device 3000 corresponding to each record, the connection I/F identifier concretely being a DB-I/F field 4001 for registering therein information on port ID of the connection I/F included in the DBMS server, and a name field 4002 for registering therein information on name granted to the connection I/F identifier registered in the field 4001.

FIG. 4B is a diagram for illustrating a configuration example of the initial setting information 2005. The initial setting information 2005 has records for each type of data transferred from the DBMS server 2000 to the storage device 3000. Each record registers therein information for indicating the type of data corresponding to each record. Concretely, each record includes a writing-out data type field 5001, a writing-out condition field 5002 for registering therein information on transmission condition of the data stored in the DBMS buffer 2002, the transmission condition being applied to the type of the data registered in the writing-out data type field 5001 and holding from the DBMS server 2000 to the storage device 3000, an in-advance notice setting condition field 5003 for registering therein information on condition of whether or not the DBMS server 2000 should transmit an in-advance notice to the storage device 3000 when the type of the data registered in the writing-out data type field 5001 is transmitted to the storage device 3000, a SCSI-ID field 5004 for registering therein an identification number (here, SCSI-ID) allocated to a SCSI target device indicating the storage device 3000 (i.e., the whole or a part of the physical disc devices included in the storage device 3000) which is to store the data to be transmitted, a LUN field 5005 for registering therein an identification number (SCSI-Logical Unit Number LUN) for accessing a physical disc device corresponding to a file which is to store the data transmitted, and a name field 5006 for registering therein a connection I/F identifier (e.g., World Wide Name (WWN)) for identifying the storage device.

The information capable of being listed as a concrete example of FIG. 4B is as follows: The data type is DB data, check point, or the like, the writing-out condition is a threshold value equal to ⅔rd of the DBMS buffer, and the in-advance notice setting condition is a threshold value equal to ⅔rd of the writing-out condition (e.g., ⅔rd of the DBMS buffer). The manager executes the management program 1036 of the management terminal 1030, thereby setting these pieces of information illustrated in FIGS. 4A-4D, i.e., the set values for each device (e.g., port ID of the connection I/F and WWN), onto the I/F management table of each device.

FIG. 4C is a diagram for illustrating a configuration example of the storage I/F management table 3006. The storage I/F management table 3006 has a record corresponding to the DBMS server for each DBMS server 2000 (regardless of the presence or absence of DBMS) connected to the storage device 3000. Each record includes a connection I/F identifier for the DBMS server 2000 corresponding to each record, the connection I/F identifier concretely being a storage-I/F field 6001 for registering therein port ID of the connection I/F included in the storage device, a name field 6002 for registering therein name granted to the connection I/F identifier registered in the field 6001, and a SCSI-ID field 6003 for registering therein a SCSI-ID of a SCSI target device made related with the I/Fs 3009 included in the storage device 3000.

FIG. 4D is a diagram for illustrating a configuration example of the management table 3005. The management table 3005 has a record corresponding to the DBMS server for each DBMS server 2000 connected to the storage device 3000. Each record includes a name field 7001 for registering therein an identifier of a DBMS server 2000 connected to the storage device 3000, a DBMS-ID field 7002 for registering therein an identifier of the DBMS 2001 which operates in the DBMS server 2000 registered into the field 7001, a LUN field 7003 for registering therein a SCSI-LUN for accessing a physical disc device 3003 into which a database (hereinafter, "DB") that the DBMS 2001 uses is stored, a cache size field 7004 for registering therein writing-size information included in the in-advance notice from the DBMS server 2000 corresponding to the record, a cache front-address field 7005 for registering therein front address of the area of the cache memory 3007 acquired based on the in-advance notice from the DBMS server 2000 corresponding to the record, a cache effective-time field 7006 for registering therein a time (which, hereinafter, will be also referred to as "effective time", and whose initial value is set by the manager via the management terminal) during which the cache memory 3007 acquired based on the in-advance notice from the DBMS server 2000 corresponding to the record continues to be acquired, an acquisition state field 7007 for registering therein state of the cut-out processing for creating an available area of the cache memory 3007 to be acquired based on the in-advance notice from the DBMS server 2000 corresponding to the record, and a writing-out data type field 7008 for registering therein type of data whose writing-out the DBMS performs.

Additionally, as the value registered into the cache effective-time field 7006, the initial value is registered at a point-in time when the record is registered. Moreover, the value decreases with a lapse of time, eventually becoming equal to "zero" when the time of the initially registered value has elapsed.

Figure 19A:
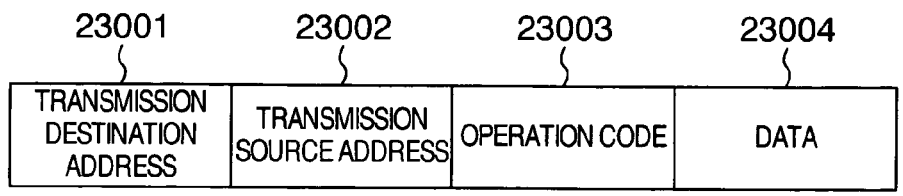
FIGS. 19A-19B are diagrams for illustrating an example of message format used between the DBMS server and the storage device.
Figure 19B:
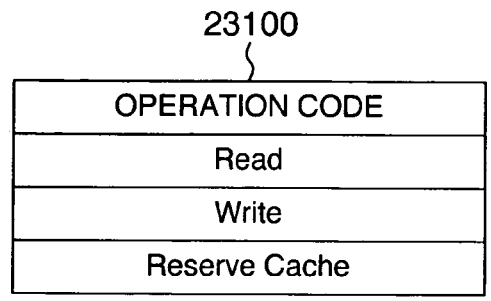

FIGS. 19A and 19B are diagrams for illustrating a configuration example of message exchanged between the DBMS server 2000 and the storage device 3000. FIG. 19A is a diagram for illustrating a format example of the message. A transmission destination address 23001 of the message inserts therein address or name for indicating the data destination address, a transmission source address 23002 inserts therein address or name for indicating the data transmission source, an operation code 23003 inserts therein an operation code for indicating content of the message, and data 23004 inserts therein the actually exchanged data (e.g., LUN, size, DBMS-ID, and data).

FIG. 19B is a diagram for illustrating an example of the operation code. Based on information indicated on the present table, the message transmission side and the message reception side identify and differentiate the content of the message. In FIG. 19B, an operation code Read indicates that the message content is a reading, Write indicates that the message content is a writing, and Reserve Cache indicates that the message content is an in-advance acquisition request for the cache memory.

As explained above, in the present embodiment, the server, using an in-advance notice, in advance notifies the storage device of occurrence of a data writing therein. After that, the server transmits data to be written (hereinafter, also referred to as "writing data") to the storage device. Hereinafter, the explanation will be given below concerning procedure steps of a processing that the DBMS server 2000 performs for transmitting the in-advance notice and the writing data to the storage device 3000. Incidentally, the processor 2007 of the DBMS server 2000 executes the DBMS-buffer writing program 2003, thereby executing this processing.

FIG. 5 is a flowchart for illustrating a step example of the processing that the DBMS server 2000 performs when transmitting the in-advance notice and the writing data to a storage device 3000. Here, the DBMS server 2000 performs three processings, i.e., monitoring of state of the DBMS buffer 2002, the in-advance notice to the storage device 3000, and the transmission of content of the DBMS buffer 2002 to the storage device 3000.

First, the DBMS server 2000 monitors data amount of the type of data (hereinafter, "monitoring target data") which is registered in the writing-out data type field 5001 of the initial setting information 2005, and which is to be written into the DBMS buffer 2002 (step 8001). Next, the DBMS server 2000 makes a comparison between size of the monitoring target data written into the DBMS buffer 2002 and data size registered in the writing-out condition field 5002 of the initial setting table 2005 (step 8002).

At the step 8002, if it has been judged that the data amount of the monitoring target data written into the DBMS buffer 2002 is larger than the data size registered in the writing-out condition field 5002 of the initial setting information 2005, the DBMS server 2000 transmits a writing request to a storage device 3000. Here, the writing request requests that the monitoring target data within the DBMS buffer 2002 be written into the storage device 3000. In this case, the DBMS server 2000 makes reference to the SCSI-ID field 5004 and the LUN field 5005 of the initial setting table 2005, thereby identifying the storage device 3000 which has stored therein a file corresponding to the monitoring target data which becomes the writing target (step 8004).

Meanwhile, if, at the step 8002, it has been judged that the data amount of the monitoring target data written into the DBMS buffer 2002 is smaller than the data size registered in the writing-out condition field 5002 of the initial setting information 2005, the DBMS server 2000 makes a comparison between the data amount of the monitoring target data in the DBMS buffer 2002 and data amount to be registered into the in-advance notice setting condition field 5003 of the initial setting table 2005 (step 8003).

At the step 8003, if it has been judged that the data amount of the monitoring target data stored into the DBMS buffer 2002 is larger than the data size to be registered into the in-advance notice setting condition field 5003 of the initial setting table 2005, the DBMS server 2000 transmits an in-advance notice to a storage device 3000. At this time, the DBMS server 2000 makes reference to the SCSI-ID field 5004 and the LUN field 5005 of the initial setting table 2005 on the basis of the type of the writing data, thereby determining the storage device 3000 to which the DBMS server 2000 actually transmits the in-advance notice (step 8005).

Meanwhile, if, at the step 8003, it has been judged that the data amount of the monitoring target data stored into the DBMS buffer 2002 is smaller than the data size to be registered into the in-advance notice setting condition field 5003 of the initial setting table 2005, the DBMS server 2000 repeats the processings at the step 8001 or thereafter.

After the processing at the step 8004 or the step 8005, the DBMS server 2000 receives a response to the writing request or a response to the in-advance notice from the storage device 3000 (step 8006). After that, the DBMS server 2000 goes back to the processing at the step 8001.

In this way, the storage device 3000 receives either the writing request or the in-advance notice. In the case of the writing request, the storage device 3000 writes the writing data into the cache memory 3007. Meanwhile, in the case of the in-advance notice, the storage device 3000 performs an in-advance acquisition processing of the cache memory 3007 on the basis of a predetermined condition.

FIG. 6 is a flowchart for illustrating an example of processing steps that the storage device 3000 performs when the storage device 3000 receives either the writing request or the in-advance notice. Incidentally, the controller 3010 of the storage device 3000 executes the storage manager 3002, thereby executing the present processing.

First, the storage device 3000 receives a message of either a writing request or an in-advance notice processing from a DBMS server 2000 via the I/F 3009 (step 9001).

Next, the storage device 3000 makes reference to the operation code 23003 within the message, thereby judging whether content of the received message is the in-advance notice or the writing request (step 9002).

If it has been judged that the message received at the step 9002 is the in-advance notice, the storage manager 3002 newly adds a record onto the management table 3005. Then, the storage manager 3002 registers the following information into a name field 7001, a DBMS-ID field 7002, a LUN field 7003, a cache size field 7004, and a writing-out data type field 7008 of the newly added recode: An I/F identifier (WWN) and DBMS-ID of the DBMS server included in the received message, a LUN to be accessed by the DBMS server, acquisition size of a cache memory requested by the DBMS server, and information indicating type of data whose writing the DBMS server is to perform. At this time, the storage device 3000 performs a status registration of "under acquisition" into an acquisition state field 7007 of the record of the registration target (step 9003).

Next, the storage device 3000 performs a processing (hereinafter, also referred to as "cache-memory acquisition processing") of acquiring the cache memory 3007. Additionally, the storage device 3000 performs the cache-memory acquisition processing by executing the cache-memory control manager 3001 using the controller 3010. The details of the cache-memory acquisition processing will be explained later (step 9004).

Having finished the cache-memory acquisition processing, the storage device 3000 registers information on front address of an available area of the acquired cache memory 3007 and the corresponding cache-memory size into a cache front-address field 7005 and a cache size field 7004 of the record where the information of "under acquisition" has been registered into the acquisition state field 7007 at the step 9003. Moreover, the storage device 3000 updates, up to information of "acquisition over", the acquisition state field 7007 into which the information of "under acquisition" has been registered. Also, the storage device 3000 sets an initial value into a cache effective-time field 7006 contained in the newly added recode (step 9005).

After that, the storage device 3000 notifies the DBMS server 2000 that the acquisition processing of the cache memory 3007 has been completed (step 9006).

Meanwhile, if it has been judged that the content of the message received at the step 9002 is not the in-advance notice, the storage device 3000 judges whether or not the writing data received from the DBMS server 2000 is writing data corresponding to the in-advance notice, i.e., writing data which should be stored into the available area of the cache memory 3007 acquired by the cache-memory acquisition processing. Concretely, the storage device 3000 makes a comparison between information on name and DBMS-ID indicating the DBMS server 2000 contained in the received message, LUN and writing-out data type, and the information registered in the management table 3005 (step 9007).

If it has been judged that both of the data coincides with each other, i.e., the content of the message is the writing data into the available area acquired within the cache memory 3007 in advance, the storage device 3000 confirms whether or not a value in a cache effective-time field 7006 of a record in the management table 3005 whose name and writing-out data type coincide with the name and the writing-out data type of the DBMS server 2000 contained in the message received at the step 9001 is an effective value. In the present embodiment, an ineffective value is set to be zero (0), and a value represented by positive integer is defined as an effective value. If the value in the cache effective-time field 7006 of the corresponding record is ineffective, the storage device 3000 deletes the information except for the name of the DBMS server 2000 of the corresponding record (step 9008).

Meanwhile, if it has been judged that the value in the cache effective-time field 7006 of the corresponding record is effective, the storage device 3000 writes the received writing request data into the cache memory 3007, using the information (i.e., LUN 7003, cache size 7004, and cache front address 7005) registered in the corresponding record in the management table 3005 (step 9009).

If, at the step 9007, it has been judged that the writing request is a writing request for which the cache memory 3007 has been not acquired in advance, or if, at the step 9008, it has been judged that the effective time of the available area of the cache memory 3007 acquired in advance is ineffective, the storage device 3000 acquires the available area of the cache memory 3007 and writes the received writing data into the cache memory 3007. After finishing the writing, the storage device 3000 notifies the DBMS server 2000 that the writing has been terminated (step 9010).

FIG. 7 is a flowchart for illustrating a detailed step example of the cache-memory acquisition processing executed at the step 9004 in FIG. 6.

First, the storage device 3000 confirms whether or not, within the cache memory 3007, an available area exists by the amount of size of the writing data whose in-advance notice has been received from the DBMS server 2000 (step 10001).

If, at the step 10001, it has been judged that there exists the available area of the cache memory 3007 by the size amount of the writing data, the storage device 3000 executes the storage manager 3002, thereby executing the processing of acquiring the cache memory 3007 by the size amount of the writing data which has been notified in advance from the DBMS server 2000. Concretely, the storage device 3000 acquires (i.e., reserves) the cache memory by the size amount of the writing data which has been notified by the in-advance notice. Here, the cache memory is in an available state managed in the cache-memory management information 3011. When the storage device 3000 has written the writing data, which is not the reservation target, into the cache memory 3007 at the step 9010 in FIG. 6, the available area of the cache memory 3007 acquired by executing this acquisition processing is judged to be in a state where the data has been already stored therein although this available area is an available area actually (step 10002).

Meanwhile, if, at the step 10001, it has been judged that there exists none of the available area of the cache memory 3007 by the size amount of the writing data, the storage device 3000 executes the cache-memory control manager 3001, thereby executing a cut-out processing. In this cut-out processing, an area of the cache memory 3007 in which least used data has been stored is cut out as an available area out of the available area of the cache memory 3007. Concerning an area (however, area whose data has been not reflected on the physical disc device is not selected as the target) of the cache memory 3007 other than the area (hereinafter, also referred to as "reserved area") acquired within the cache memory 3007 already registered in the management table 3005, the storage device 3000, using a Least Recently Used algorithm (LRU algorithm), retrieves the least used area of the cache memory 3007 out of the cache memory 3007 managed in the cache-memory management information 3011. Moreover, of the retrieved storage area of the cache memory 3007, the storage device 3000 liberates the area of the cache memory 3007 by the size amount (insufficient amount if part is filled available area) of the writing data whose in-advance notice has been received (step 10003). After that, the storage device 3000 performs a processing of acquiring an area of the cache memory 3007 with respect to the available area of the cache memory 3007 cut out at the step 10003. Concretely, the storage device 3000 executes the cache-memory control manager 3001, thereby performing the processing of acquiring the available area by the size amount of the writing data which has been notified by the in-advance notice. The execution of this processing brings the cut-out available area of the cache memory 3007 into a state (i.e., reserved state) where the data has been already stored therein seemingly (step 10004).

After that, the cache-memory control manager 3001 notifies the storage manager about the front address and the size of the acquired cache area (step 10005).

The storage device 3000 performs the above-described processing, thereby reserving the available area of the cache memory 3007 on the basis of the instruction from the DBMS server 2000. However, continuing to reserve the available area of the cache memory 3007 without stopping it causes a waste to occur in the storage area of the cache memory 3007. On account of this, in the present embodiment, the storage device 3000 imposes a limit to a time during which reserving the cache memory 3007 is allowable, thereby clearing a reservation with which a certain constant time-period has elapsed.

Figures 8, 9:
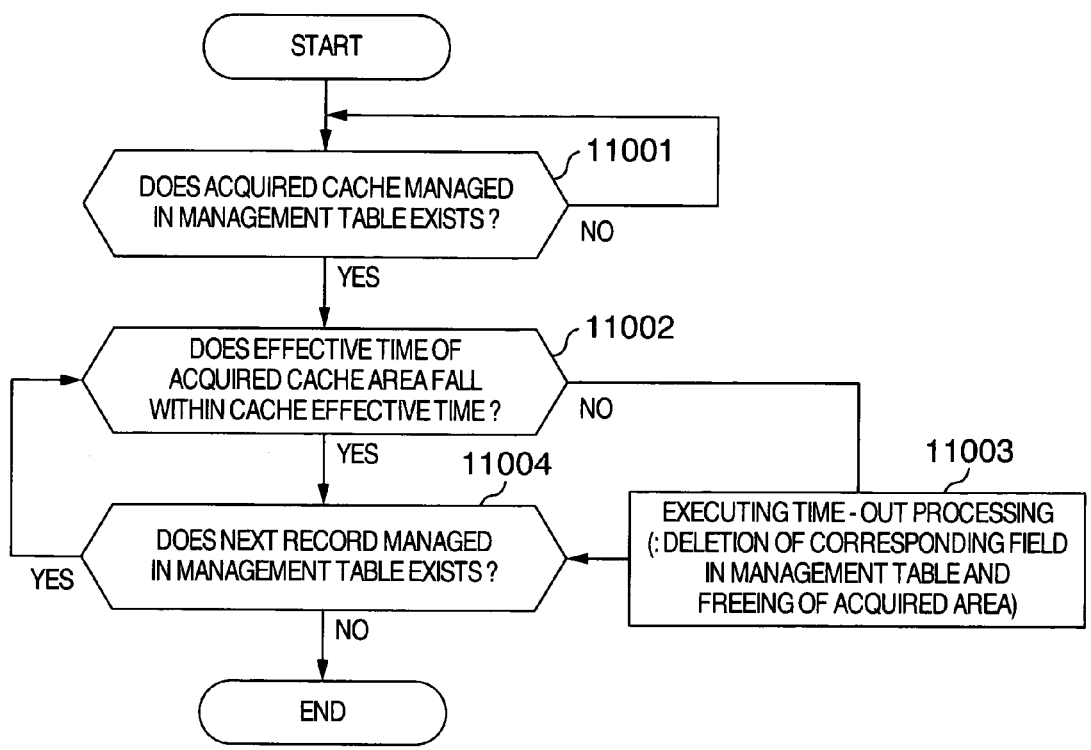
FIG. 8 is a flowchart for illustrating an example of a processing of monitoring effective time of the cache memory acquired by the storage device.
FIG. 9 is a diagram for illustrating an example of setting table.

FIG. 8 is a flowchart for illustrating processing steps by which the storage device 3000 monitors effective time of the reservation of an available area of the acquired cache memory 3007, and cancels the reservation of the available area of the acquired cache memory 3007 with respect to the area whose effective time has elapsed. Additionally, the storage device 3000 performs the present processing with a predetermined timing (e.g., on a certain time-period basis, or when total amount of unreserved available area of the cache memory 3007 becomes lower than a predetermined value, or the like) or always.

First, the storage device 3000 confirms whether or not there exists an available area of the reserved cache memory 3007 managed within the management table 3005. If none of information on the reserved cache memory 3007 has been registered in the management table 3005, the storage device 3000 repeats the processing at a step 11001. Here, the timing with which the processing at the step 11001 is repeated may be the above-described predetermined timing, or the instant timing (step 11001).

If the information on the reserved cache memory 3007 has been registered in the management table 3005, the storage device 3000 confirms whether or not a value registered in a cache effective-time field 7006 of a record in the management table 3005 corresponding to the reserved cache memory 3007 is effective (step 11002).

If, at the step 11002, it has been judged that the effective time of the reserved cache memory 3007 is ineffective (which is 0 here), the storage device 3000 performs freeing of the available area of the reserved cache memory 3007. Concretely, from the management information on the cache memory 3007 registered in the cache-memory management information 3011, the cache-memory control manager 3001 performs the freeing of (i.e., modifies into an unused state) state of the area of the cache memory 3007 by the amount of the cache size 18004 from the cache front address 18005 registered in the management table 3005. Also, the storage device 3000 deletes data content of the record in the management table 3005 corresponding to the freed available area of the cache memory 3007 (step 11003).

Meanwhile, if, at the step 11002, it has been judged that the effective time of the reserved cache memory 3007 is effective, the storage device 3000 confirms whether or not there exists a next record. If there exists the record, the storage device goes back to the processing at the step 11002. If there exists no record, the storage device terminates the processing (step 11004).

In the present embodiment, the DBMS server 2000 in advance notifies the storage device 3000 that the DBMS server 2000 will make a data writing request. Furthermore, the storage device 3000 in advance acquires (i.e., reserves) an available area of the cache memory 3007. Conventionally, the acquisition processing (including the cut-out processing) of the cache memory 3007 has been performed each time a data writing request is received in the storage device 3000. This in-advance notice, however, allows this acquisition processing to be performed prior to the data writing processing. This condition makes it possible to shorten the response time of the storage device 3000 to the data writing request from the DBMS server 2000.

Additionally, in the present embodiment, a configuration may also selectable where the processing regarding the effective time is omitted, i.e., the available area of the cache memory reserved by the in-advance notice continues to be reserved until the available area is actually used. In this case, it is absolutely certain to shorten the data writing processing requested by a server for which the cache memory has been reserved.

Second Embodiment

Next, the explanation will be given below concerning a second embodiment.

In the present embodiment, in addition to the configuration of the first embodiment, the DBMS server 2000, depending on the state of the storage device 3000, modifies a timing or the like with which the in-advance notice is to be issued to the storage device 3000.

Concretely, consider a case where in-advance reservation of the cache memory 3007 of the storage device 3000 is made from the one or plural DBMS 2001 of the plural DBMS servers 2000. In this case, if, due to this in-advance reservation, a DBMS server 2000 fails to make reservation of the cache memory 3007 newly, the DBMS server 2000 which has failed to make the reservation suppresses data size of writing request or requests issued from the one or plural DBMS 2001, then managing load on the storage device 3000 and situation of the cache memory 3007. In the following explanation, only the points which are modified from the first embodiment will be explained.

FIG. 9 is a diagram for illustrating an example of the setting table 3004. The content of the setting table 3004 is set by the manager via the network or the like. The setting table 3004 registers therein the information that the DBMS server 2000 necessitates when, depending on load on the storage device 3000 and situation of the cache memory 3007, the DBMS server 2000 modifies the transmission timing and content of its own writing request and in-advance notice.

The setting table 3004 has records for each type of data transferred from the DBMS server 2000 to the storage device 3000. Each record includes a name field 12001 for registering therein an identifier of a DBMS server 2000 corresponding to each record, a DBMS-ID field 12002 for registering therein an identifier of the DBMS 2001 which operates within the DBMS server 2000 corresponding to each record, a writing-out data type field 12003 for registering therein type of the data which the DBMS 2001 writes into the storage device 3000, a writing-out condition modification field 12004 for registering therein a modified value of threshold value of the condition at the time when the DBMS 2001 writes the data into the storage device 3000, an in-advance notice condition modification field 12005 for registering therein a modified value of threshold value of the condition at the time when the DBMS server 2000 transmits the in-advance notice to the storage device 3000, a SCSI-ID field 12006 for registering therein an identification number of a SCSI target device corresponding to each type of the writing data, and a LUN field 12007 for registering therein a SCSI-LUN for accessing a physical disc device 3003 corresponding to each type of the writing data.

For example, the in-advance notice condition modification field 12005 specifies therein a data size such as ¾th of the writing-out condition, which is lower than the data size (i.e., the writing-out condition field 5002 in FIG. 4B) in which the DBMS 2001 has performed the writing.

In the present embodiment, if the storage device 3000, which had received the in-advance notice from the DBMS server 2000, has failed to acquire in advance the available area of the cache memory 3007, the storage device 3000 requests the DBMS server 2000 to modify the writing threshold value and the threshold value at the time when the in-advance notice is to be issued. At this time, based on the information registered in the setting table 3004, the storage device 3000 transmits, to the DBMS server 2000, the information on the threshold values after being modified. Incidentally, a configuration is also considerable where the DBMS server 2000 has the information to be registered into the setting table 3004, and where the storage device 3000 performs only the request for modification of the threshold values.

FIG. 10 is a flowchart for illustrating an example of the processing steps in the present embodiment by the storage device 3000 which has received the in-advance notice from the DBMS server 2000.

The storage device 3000, which has received the in-advance notice from the DBMS server 2000, judges whether or not it is possible to acquire the available area of the cache memory 3007 in the size whose notice has been received from the DBMS server 2000. Concretely, the storage device 3000 executes the storage manager 3002, thereby making reference to the area information on the cache memory 3007 acquired by the in-advance notice from the DBMS server 2000 in the management table 3005, and the information on the cache memory 3007 managed in the cache-memory management information 3011. As a result of this reference, the storage device 3000 makes a judgment as to whether or not the entire cache memory 3007 has been reserved (or is in use) (step 13001).

If it has been judged that it is possible to acquire the available area of the cache memory 3007, the storage device 3000 executes the processings illustrated in FIG. 6 of the first embodiment (step 13002).

Meanwhile, it has been judged that it is impossible to acquire the available area of the cache memory 3007, the storage device 3000 transmits a modified value of the specified writing threshold value along with a modification request to the DBMS server 2000 which has transmitted the in-advance notice (step 13003).

As illustrated in FIG. 11, the DBMS server 2000 receives, from the storage device 3000, the modification request for the threshold value, i.e., the data writing-out condition of the DBMS server 2000. Then, the DBMS server 2000 updates the threshold value, i.e., the writing-out condition for the writing-out data type, and the threshold value. i.e., the condition on which the in-advance notice is to be issued, by the modified values of these threshold values contained in the modification request.

In the present embodiment, when the plural DBMS servers 2000 had transmitted the in-advance notice to the storage device 3000 from the one or plural DBMS 2001, if the storage device 3000 has failed to acquire in advance the available area of the cache memory 3007, the storage device 3000 requests the DBMS server 2000 to suppress the data size in which the writing is to be performed. Then, the DBMS server 2000 executes the corresponding modification processing. This makes it possible to adjust the writing processing on the side of the DBMS server 2000 when the load on the storage device 3000 is high, or when it is impossible to acquire the cache memory 3007.

Third Embodiment

Next, the explanation will be given below concerning a third embodiment. In the present embodiment, of the data to be written from the DBMS 2002 of the DBMS server 2000 to the storage device 3000, the storage device 3000 reserves the cache memory 3007 with the highest priority given to writing of processing history (hereinafter, "log data") in the DBMS 2001. Additionally, in the following explanation, only the points which differ from the first embodiment will be explained.

Figure 12:
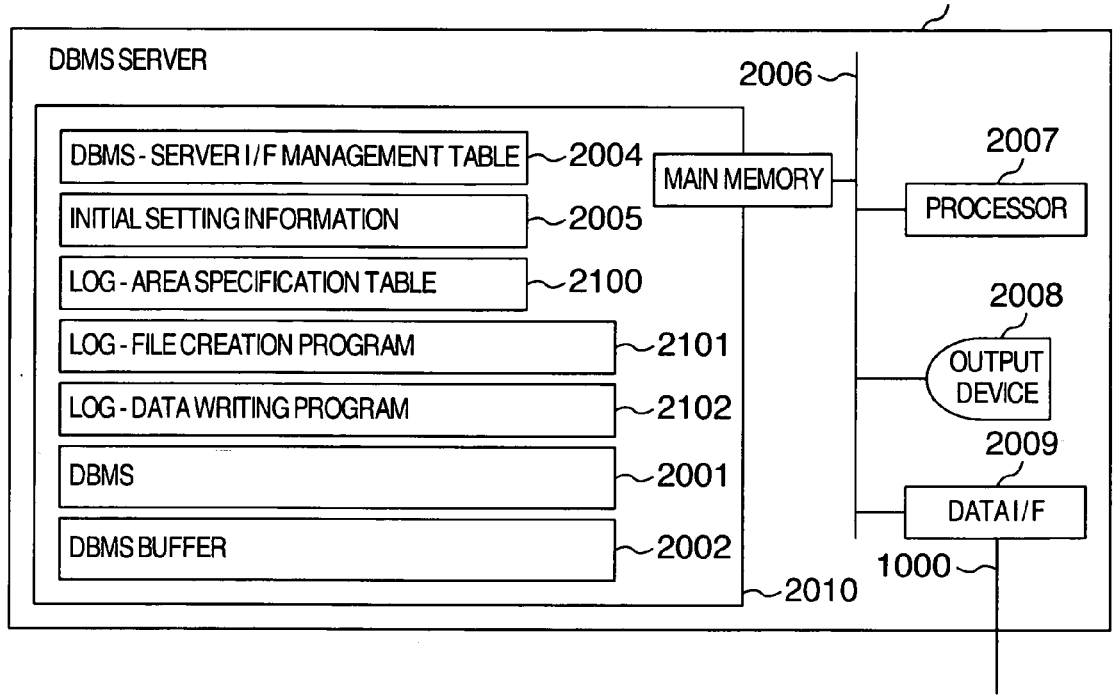
FIG. 12 is a diagram for illustrating a configuration example of the DBMS server.

FIG. 12 is a diagram for illustrating a configuration example of the DBMS server 2000 in the present embodiment. In addition to the programs and the like explained in the first embodiment, the main memory 2010 newly stores therein a log-area specification table 2100, a log-file creation program 2101, and a log-data writing program 2102.

Figure 13:
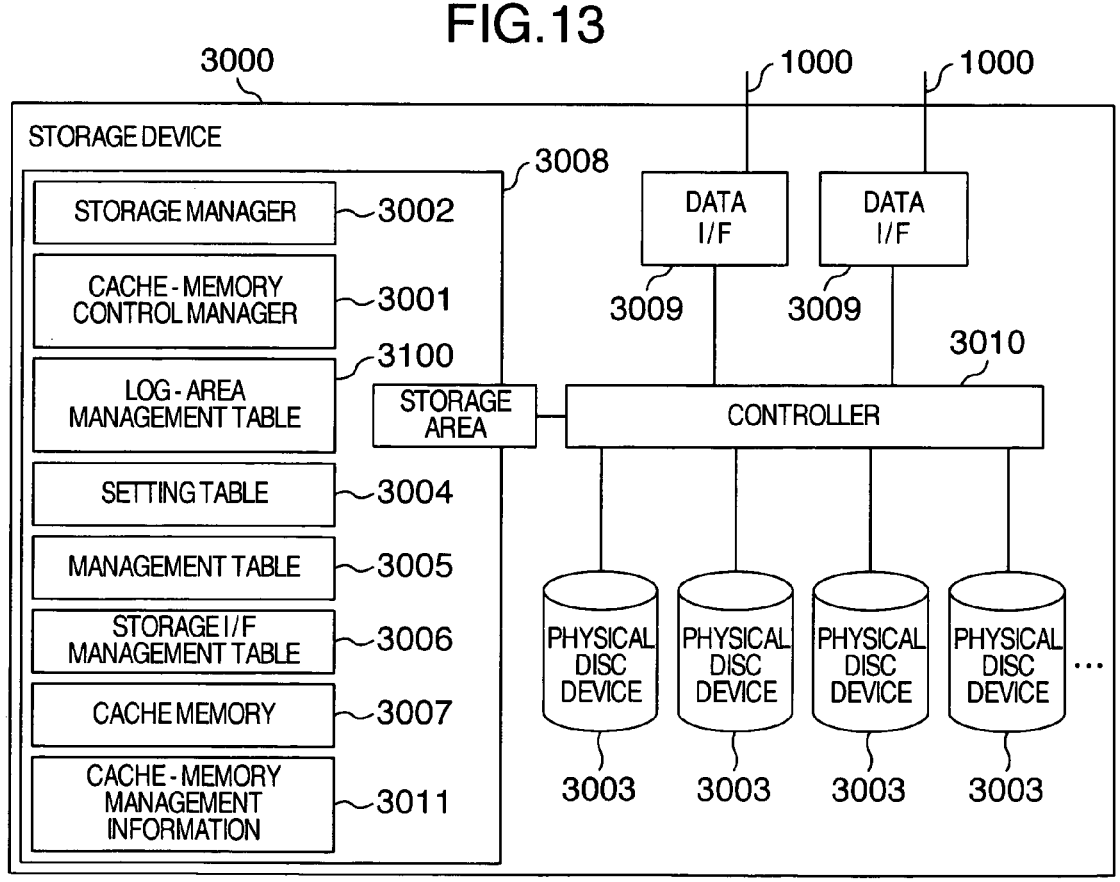
FIG. 13 is a diagram for illustrating a configuration example of the storage device.

FIG. 13 is a diagram for illustrating a configuration example of the storage device 3000 in the present embodiment. In addition to the programs and the like explained in the first embodiment, the storage area 3008 newly stores therein a log-area management table 3100.

FIG. 14 is a diagram for illustrating a configuration example of the log-area specification table 2100. The log-area specification table 2100 is a table that the DBMS server 2000 uses when managing storage location of the log data in the storage device 3000. The log-area specification table 2100 has corresponding records for each type of the log data that the DBMS server 2000 stores into the storage device 3000. Each record includes a log-data storage file name field 17001 for registering therein a file name into which the log data corresponding to each record is written, a SCSI-ID field 17002 for registering therein an identification number of a SCSI target device into which the corresponding log data is stored, and a LUN field 17003 for registering therein a SCSI-LUN for accessing a physical disc device 3003 into which the corresponding log data is stored.

FIG. 15 is a diagram for illustrating a configuration example of the log-area management table 3100. The log-area management table 3100 is a table that the storage device 3000 uses when acquiring an available area of the cache memory 3007 for storing the log data. The log-area management table 3100 has records for each type of the data transferred from the DBMS server 2000 to the storage device 3000.

Each record includes a name field 18001 for registering therein an identifier of a DBMS server 2000 corresponding to each record, a DBMS-ID field 18002 for registering therein an identifier of the DBMS 2001 which operates within the corresponding DBMS server 2000, a LUN field 18003 for registering therein a SCSI-LUN of a physical disc device 3003 that the DBMS 2001 corresponding to the record uses for storing the log data, a cache size field 18004 for registering therein a value of writing size of the log data notified in advance by the DBMS 2001 corresponding to the record, a cache front-address field 18005 for registering therein front address at the time when the writing data of the DBMS 2001 corresponding to the record is stored into the cache memory 3007 of the storage device 3000, an effective-time field 18006 for registering therein an effective time of the cache memory 3007 of the storage device 3000 used for writing the log data, a threshold-value field 18007 for registering therein a threshold value of writing size at the time when the log data in the cache memory 3007 are collectively written into the physical disc device 3003 in a unit of, e.g., stripe size of the storage device 3000, an acquisition state field 18008 for registering therein state of the process of acquiring the cache memory 3007 of the storage device 3000, a log-data storage file name field 18009 for registering therein the file name into which the log data is written, and a writing flag field 18010 for registering therein flag information indicating whether or not the log data has been written into the area of the acquired cache memory 3007.

In the present embodiment, the DBMS server 2000 specifies, to the storage device 3000, the storage area (hereinafter, "log area") for storing the log data. At this time, the storage device 3000 makes the reservation of the cache memory with an available area of the cache memory as the available area of the cache memory for storing the log data. After that, if writing the log data has occurred actually, the storage device 3000 writes the log data into the available area of the cache memory acquired in advance.

Figure 16:
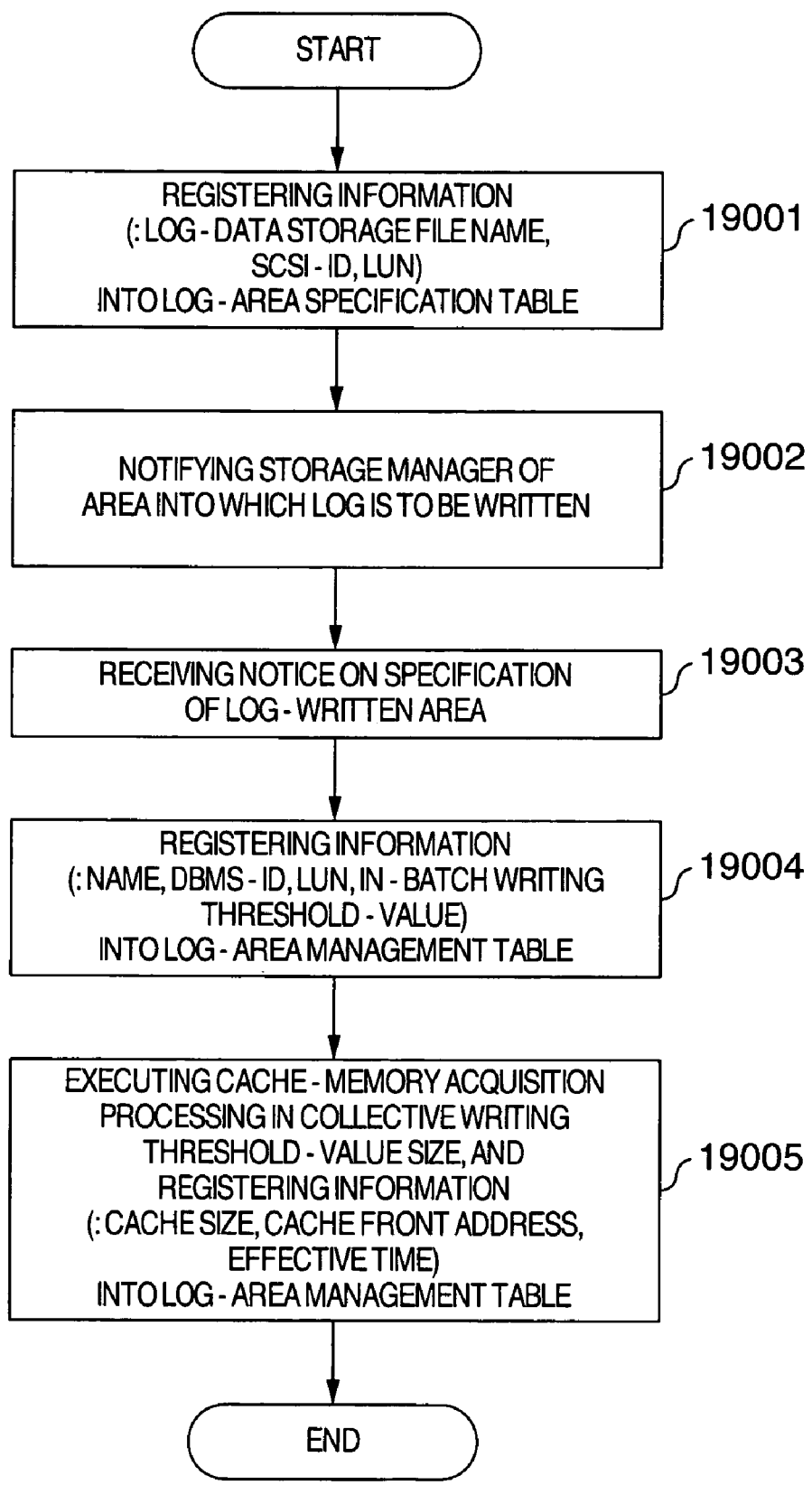
FIG. 16 is a flowchart for illustrating an example of a processing of performing log-area creation by the DBMS server and information registration into the log-area management table by the storage device.

FIG. 16 is a flowchart for illustrating an example of processing steps by which, when the DBMS 2001 creates the log area on the basis of the initial setting, the DBMS server 2000 and the storage device 3000 register information on the log area into the log-area specification table 2100 and the log-area management table 3100. The present processing is performed based on execution of the log-file creation program 2101 in the DBMS server 2000 and execution of the storage manager 3002 in the storage device 3000.

Based on information received from the manager or the like, the DBMS server 2000 determines information such as a file name and the like indicating a location into which the log data is to be stored in the storage device 3000. After that, the DBMS server 2000 registers into the log-area specification table 2100 the determined information, which are, concretely, the file name, an identification number of a SCSI target device into which the log data is to be stored, and a SCSI-LUN (step 19001).

Next, the DBMS server 2000 notifies the storage device 3000 of the information registered at the step 19001 (step 19002).

The storage device 3000 receives, from the DBMS server 2000, the information on the area into which the log data is to be written (step 19003). Next, the storage device 3000 registers, into a record of the log-area management table 3100, the received information on the area into which the log data is to be written. Here, the storage device 3000, from the received information, extracts information on name of the DBMS server 2000 which has transmitted the notice, DBMS-ID, and LUN, then registering the extracted information into the log-area management table 3100. Meanwhile, into the in-batch writing threshold-value field 18007, the storage device 3000 registers a threshold value specified by the manager (step 19004).

Next, the storage device 3000 acquires (i.e., reserves) an available area of the cache memory 3007 in the size specified by the in-batch writing threshold-value field 18007 registered into the log-area management table 3100. The processing executed in this case is the same as the cache-memory acquisition processing (FIG. 7) explained in the first embodiment. After that, based on the information on the reserved available area of the cache memory 3007, the storage device 3000 registers the information into the cache size field 18004, the cache front-address field 18005, and the effective-time field 18006 of the log-area management table 3100. As the effective time to be registered into the effective-time field 18006, a time is inputted which is estimated by the manager from the information such as capacity of the cache memory 3007 of the storage device 3000 and the size in which the in-batch writing is performed (step 19005).

In the present embodiment, in the case of writing the log data, the DBMS server 2000 performs none of the in-advance notice. This is because it is substituted for the in-advance notice that the DBMS server 2000 has transmitted beforehand the information on the log area to the storage device 3000. Moreover, the storage device 3000, which has received the information on the log area once, acquires a certain amount of available area of the cache memory 3007 for the log data always in a state where the storage device 3000 has received the in-advance notice. Furthermore, the storage device 3000 which receives the log-data writing request writes the log data into the already acquired available area.

FIG. 17 is a flowchart for illustrating an example of processing steps that the storage device 3000 performs in the present embodiment when the storage device 3000 receives a data writing request from the DBMS server 2000.

First, the storage device 3000 receives a data writing request from the DBMS server 2000 (step 21001). Next, the storage device 3000 judges whether or not the received data writing request is a log-data writing request. Concretely, the storage device 3000 confirms whether or not information contained in the writing request and indicating a writing area coincides with the information registered in the name field 18001, the DBMS-ID field 18002, and the LUN field 18003 of the log-area management table 3100 (step 21002).

If it has been judged that the data which becomes the target of the received writing request is not log data, the storage device 3000 executes the data writing processings explained in FIG. 6 of the first embodiment (step 21007).

Meanwhile, if it has been judged that the data which becomes the target of the writing request received at the step 21002 is the log data, the storage device 3000 writes the log data into the acquired cache memory 3007 registered in the log-area management table 3100. Furthermore, if a flag in the writing flag field 18010 of the log-area management table 3100 is not set, the storage device 3000 performs a processing of setting the flag (in the present embodiment, the state where the flag is set is defined as "1".) (step 21003).

Next, the storage device 3000 confirms whether or not data size of the log data written into the cache memory 3007 has reached the data size registered in the in-batch writing threshold-value field 18007 of the log-area management table 3100. If the data size has not reached the in-batch writing threshold-value 18007, the storage device 3000 terminates the present processing (step 21004).

If, at the step 21004, it has been judged that the data size of the log data written into the cache memory 3007 has reached the data size specified in the in-batch writing threshold-value field 18007, the storage device 3000 acquires an available area of the cache memory 3007 for newly writing the log data therein by the size amount specified in the cache size field 18004 of the log-area management table 3100. The present processing is the same as the cache-memory acquisition processing (FIG. 7) explained in the first embodiment. Also, the storage device 3000 adds, to the log-area management table 3100, a record for registering information (i.e., name 18001, DBMS-ID 18002, LUN 18003, cache size 18004, cache front address 18005, effective time 18006, in-batch writing threshold-value 18007, acquisition state 18008, and log-data storage file name 18009) on the newly acquired cache memory 3007. The storage device 3000 modifies, into a state of "under writing into disk", the acquisition state 18008 in the corresponding record of the log-area management table 3100 for performing management of the cache memory 3007 into which the log data has been written (step 21006).

Next, the storage device 3000 writes the log data stored in the cache memory 3007 into the physical disc device 3003. After having finished the writing, the storage device 3000 deletes the corresponding record of the log-area management table 3100 which manages the cache memory 3007 in which the log data whose writing has been executed had been stored (step 21005).

Next, the storage device 3000 performs liberation of the cache memory 3007 into which the log data written at the step 21005 has been stored. The present processing is the same as the freeing processing (step 11003 in FIG. 8) of freeing the area of the cache memory 3007 explained in the first embodiment (step 21010).

In the present embodiment, the storage device 3000 always acquires the available area of the cache memory 3007 for the log data. The storage device 3000, however, cannot use all the storage areas for only the log data. Consequently, the amount of the available area acquired for the log data is necessarily limited. In this case, if the log data continues to be held within the cache memory 3007 for a considerably long time, the storage device 3000 cannot avoid performing the cut-out processing when storing some other log data into the cache memory 3007. This reduces the effect of having beforehand acquired the available area of the cache memory 3007.

Accordingly, in the present embodiment, with respect to log data with which a predetermined time has elapsed since the storage of the log data into the cache memory 3007, the storage device 3000 performs a processing of compulsorily storing the log data into the physical disc device 3003. This makes it possible to always acquire a predetermined amount of available area of the cache memory 3007 for the log data. Also, in the present embodiment, at a point-in-time when the area of the cache memory 3007 into which the log data has been written has reached the in-batch writing threshold-value 18007, the cache memory 3007 for storing the next log data is acquired. However, an embodiment is also considerable where the acquisition of the cache memory 3007 is performed before the area has reached the in-batch writing threshold-value 18007.

FIG. 18 is a flowchart for illustrating an example of processing steps by which the storage device 3000 monitors storage effective-time of the cache memory 3007 into which the log data has been written, and writes the log data in the cache memory 3007 into the physical disc device 3003 with respect to the area whose storage effective-time has elapsed. The storage device 3000 performs the present processing on a certain time-period basis or with a predetermined timing (e.g., when capacity of the available area of the cache memory acquired for the log data becomes lower than a threshold value).

First, referring to the writing flag field 18010 of the log-area management table 3100, the storage device 3000 confirms whether or not there exists an area of the cache memory 3007 into which the log data has been written. If none of information on the cache memory 3007 into which the log data has been written is registered in the log-area management table 3100, the storage device 3000 repeats the processing at a step 22001 (step 22001).

If it has been judged that the information on the cache memory 3007 into which the log data has been written is registered in the log-area management table 3100, the storage device 3000 confirms whether or not a value registered in the effective-time field 18006 of the log-area management table 3100 falls within an effective time (step 22002).

If, at the step 22002, it has been judged that the time of the cache memory 3007 into which the log data has been written is not the effective time, the storage device 3000 writes the log data in the cache memory 3007 into the physical disc device 3003. After that, the storage device 3000 deletes, from the log-area management table 3100, the information for managing the area of the cache memory 3007 in which the log data whose writing processing has been executed had been stored (step 22003).

Next, in accordance with the processing steps described in the first embodiment, the storage device 3000 executes an acquisition processing for an area of the cache memory 3007 for newly writing the log data therein (step 22004).

In the present embodiment, with respect to the log data whose writing is performed from the DBMS server 2000, the storage device 3000 is-in advance notified of the area into which the log data is to be written. This makes it possible to write the log data on the cache memory 3007 of the storage device 3000 into the physical disc device 3003 in the high-efficiency unit.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system, wherein,
a plurality of computers, each computer including a processor, a storage area and a memory storing a first program and a table of initial setting information; and
a storage device connected to said plurality of computers;
wherein:
one of said plurality of computers is adapted to set a predetermined threshold value and data type for data to be transmitted from said plurality of computers to said storage device in said table,
said storage device further includes a control unit having a cache memory, and a disk device,
said storage area temporarily saves data to be transmitted to said storage device,
said plurality of computers are adapted to determine whether or not to transmit in-advance information on the basis that said data to be sent exceeds said predetermined threshold value and has a type which is the same as said data type by said processors executing said first program, said information notifying that said computer will perform said data transmission, and
said control unit of said storage device is adapted to judge, when having received said in-advance information, whether or not an available area for said data to be transmitted exists within said cache memory, and, if said available area does not exist, to acquire said available area for said data to be transmitted via said data transmission specified by said in-advance information by executing a second program stored inside said storage device,
said table of initial setting information includes DB data and a check point for said data type;
said table of initial setting information includes threshold values for a writing-out condition for said data; and
said table of initial setting information includes an in-advance notice setting condition of threshold values which are determined with regard to said writing-out condition for said data.

2. The system according to claim 1, wherein,
said writing-out condition for said data is a threshold value equal to two-thirds of the writing-out condition in said storage area and said in-advance notice setting condition is equal to two-thirds of the writing-out condition.

3. A computer, wherein,
an interface connected to said storage device;
a processor;

a storage area; and a memory to store a first program and a table of initial setting information;

wherein said processor is adapted to set a predetermined threshold value and data type for data to be transmitted from said processor to said storage device in said table, wherein said storage area temporarily saves said data to be transmitted to said storage device, wherein said processor is adapted to determine whether or not to transmit in-advance information on the basis that said data to be sent exceeds said predetermined threshold value and has a type which is the same as said data type, before transmitting said data saved in said storage area to said storage device, by said processor executing said first program; and wherein said storage device includes means for determining whether an available area exists in said storage device, in response to receiving said information, by executing a second program stored inside said storage device, said table of initial setting information includes DB data and a check point for said data type;

said table of initial setting information includes threshold values for a writing-out condition for said data; and said table of initial setting information includes an in-advance notice setting condition of threshold values which are determined with regard to said writing-out condition for said data.

4. The system according to claim 3, wherein, said writing-out condition for said data is a threshold value equal to two-thirds of the writing-out condition in said storage area and said in-advance notice setting condition is equal to two-thirds of the writing-out condition.

5. A method, wherein, in a system including a plurality of computers and a storage device, said storage device being connected to said computer and having a control unit and a cache memory, and each of said plurality of computers including a processor, a storage area, a memory storing a first program and a table of initial setting information, said allocation method comprising the steps of:

in one of said plurality of computers, setting a predetermined threshold value and data type for data to be transmitted from said plurality of computers to said storage device in said table, temporarily saving, in said storage area, said data to be transmitted to said storage device, determining, in said plurality of computers, whether or not to transmit in-advance information on the basis that said data to be sent exceeds said predetermined threshold value and has a type which is the same as said data type, before transmitting said data saved in said storage area to said storage device, by said processors executing said first program, judging, in said control unit of said storage device, when having received said in-advance information, whether or not an available area for said data to be transmitted exists within said cache memory, and, acquiring, in said control unit of said storage device, if said available area does not exist, said available area for said data to be transmitted via said data transmission specified by said in-advance information by executing a second program stored inside said storage device, said table of initial setting information includes DB data and a check point for said data type;

said table of initial setting information includes threshold values for a writing-out condition for said data; and said table of initial setting information includes an in-advance notice setting condition of threshold values which are determined with regard to said writing-out condition for said data.

6. The method according to 5, wherein, said writing-out condition for said data is a threshold value equal to two-thirds of the writing-out condition in said storage area and said in-advance notice setting condition is equal to two-thirds of the writing-out condition.

* * * * *